I. L. BANCALARI.
BICYCLE SUPPORT.
APPLICATION FILED FEB. 10, 1917.
1,233,300.
Patented July 17, 1917.
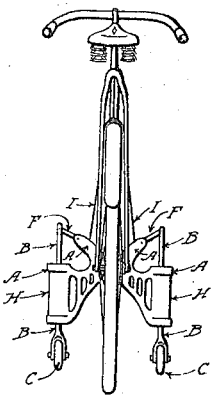
Fig. 2.
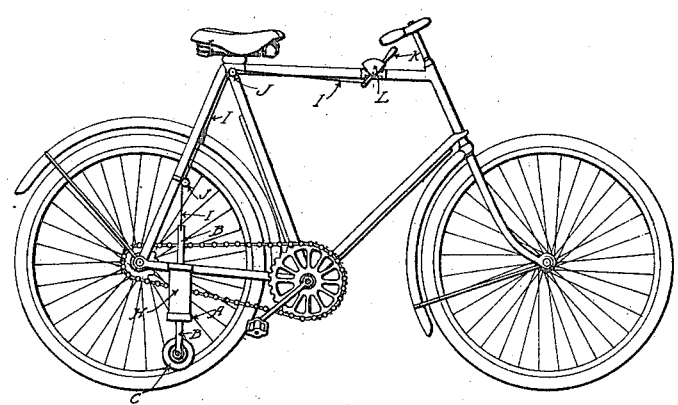
Fig. 1.
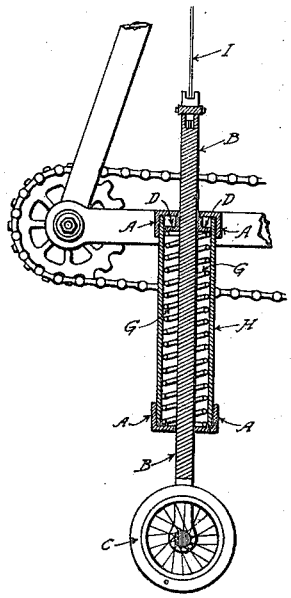
Fig. 3.
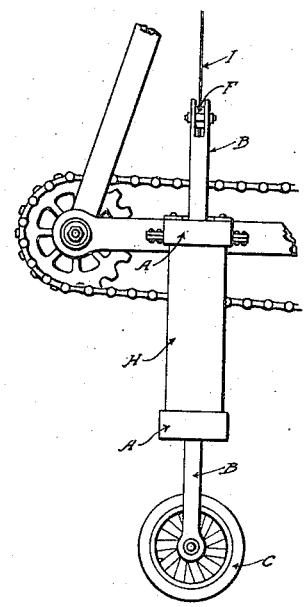
Fig. 4.
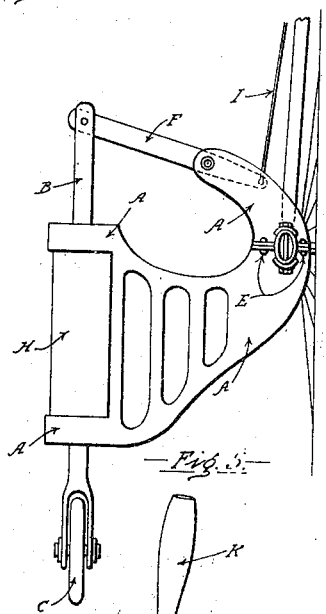
Fig. 5.
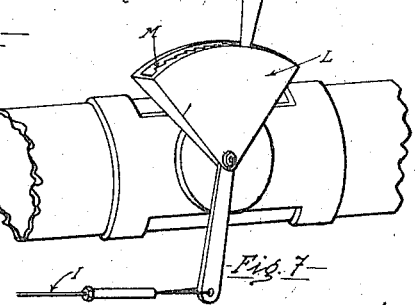
Fig. 6. Fig. 7.
Inventor:
Ignacio L. Bancalari
By Emil Poinsel &c
Attorney.

UNITED STATES PATENT OFFICE.

IGNACIO LÓPEZ BANCALARI, OF MEXICO, MEXICO.

BICYCLE-SUPPORT.

1,233,300.      Specification of Letters Patent.      Patented July 17, 1917.

Application filed February 10, 1917. Serial No. 147,924.

*To all whom it may concern:*

Be it known that I, IGNACIO LÓPEZ BANCALARI, a citizen of the United Mexican States, residing at Mexico City, Federal District, Mexico, have invented certain new and useful Improvements in Bicycle-Supports, of which the following is a specification.

The present invention has reference to bicycle supports, and it proposes, briefly, an improved stabilizing device which is so constructed as to be capable of being brought into action at the will of the rider, who is thereby enabled to stop and subsequently start his wheel without dismounting, the device also serving to facilitate both the instruction of persons learning to ride, as well as actual riding over wet or muddy roads, without in any way interfering with the velocity of the wheel, due to the fact that the action of the device is to steady the wheel at opposite sides.

An embodiment of the invention is illustrated in the accompanying drawing, in which—

Figures 1 and 2 are, respectively, a side elevation and a rear elevation of a bicycle equipped with the improved support.

Fig. 3 is an enlarged vertical section.

Figs. 4 and 5 are, respectively, a side elevation and a rear elevation of Fig. 3.

Fig. 6 is an enlarged, fragmental perspective view, showing the mounting of the cable and pulley associated with the support.

Fig. 7 is a similar view of the device for operating the cable.

Referring more particularly to said drawing, there is provided, at each side of the rear wheel of the bicycle, a substantially horn-shaped bracket A, formed by a two-part metal plate whose component members are clamped together at E to the adjacent leg of the forked, horizontal bottom member of the bicycle frame, it being understood that the latter and, in fact, the bicycle itself as a whole, may be of any standard type. These brackets are so arranged that the short, upper member of each of them overhangs the longer lower member thereof, as clearly shown in Fig. 5, and curves upwardly and outwardly away from the wheel, the two brackets being disposed in alinement with each other in a vertical plane which is perpendicular to the plane of the wheel and lies slightly in front of the wheel axle or shaft.

The lower member of each bracket has an enlarged, flaring mouth, which is bifurcated or cut away to provide spaced, upper and lower cup-like heads or caps to receive the ends of a hollow, cylindrical casing H, wherein an expansible spring G is housed. This spring exerts its pressure in an upward direction against a disk D, which is fixed to a vertical rod B, mounted to slide freely through the casing and through alining openings formed centrally in the casing heads, and projecting an appreciable distance above and below the casing. The aforesaid rod constitutes the principal element of the support, and as there is one of these rods at each side of the bicycle, it will be understood that the support, in effect at least, is of duplex construction, each rod carrying at its lower end a small, freely-rotatable wheel or other ground-engaging member C, and having its upper end connected in a loose, pivotal manner to the outer end of a lever F, which, in turn, is pivoted intermediate its ends to the outer end of the short upper member of the adjacent bracket A.

In consequence of the arrangement just described, it will be apparent that when the rods are lowered, so as to bring their ground wheels C into contact with the surface of the road or street at opposite sides of the rear wheel of the bicycle, the latter will be steadied and supported in upright, riding position, and the rider can stop the bicycle, remain stationary and subsequently start it again, without being required to dismount.

The pressure of the springs G, however, is exerted in an upward direction, as previously stated, against the disks D, for which reason the support, as an entirety, will normally be held in an ineffective, elevated position. It is necessary, therefore, to provide a device by means of which the wheel-carrying rods may be depressed, against the action of their controlling springs, into supporting or ground-engaging position, as will be understood; and in the construction illustrated, there are utilized for that purpose, two steel cables or other flexible elements I, which are connected at their front ends to a lever K, as shown in Fig. 7, that serves to operate both of them simultaneously. From the lever, the cables are led rearwardly along the top bar of the frame, and then downwardly along the rear fork thereof, over guide pulleys J, affixed to the frame members at suitable points, their rear ends being fastened to the inner ends of the levers F, The tension of the springs is thus transmitted to the cables, and thence to the operating lever K, which is normally held thereby in the position represented in Fig. 1, but which when moved backward out of such position, will pull the cables forward, thus raising the inner arms of the levers F and depressing their outer arms, with the result that the wheel-carrying rods B are pushed forcibly downward into contact with the ground.

The operating lever K, as shown in Figs. 1 and 7, is carried by the top bar of the frame; and in order to retain it in its rear or actuated position, there is preferably associated with said lever a rack M, (Fig. 7), here shown as arranged within a bracket L, in which the lever is mounted, the bracket being fastened in any desired manner to the afore-mentioned frame bar at a point comparatively close to the handle-bars so as to dispose the lever within easy reach of the hands of the rider. The lever is designed to have a slight lateral movement, in order to enable its engagement with, and disengagement from, the rack teeth.

The invention, its mode of operation, and its advantages, are believed to be apparent from the foregoing, and, therefore, to require no further explanation; but it may be stated, however, that the said invention is manifestly susceptible of attachment, readily and quickly and without the aid of special tools, to the frame of any standard or conventional type of bicycle, and removed therefrom with equal facility.

I claim as my invention:—

1. A bicycle support, comprising a pair of laterally-projecting, stationary brackets disposed in alinement at opposite sides of one wheel of the bicycle and secured to the adjacent frame member; a vertical rod mounted to slide in each bracket and provided at its lower end with a ground-engaging member; a spring associated with each rod for normally holding it in elevated position; a lever fulcrumed on each bracket and pivotally connected to the upper end of the adjacent rod; a cable fastened at its lower end to each lever; and an operating lever carried by said frame and having the upper ends of both cables fastened thereto, for rocking said levers simultaneously in a direction to forcibly depress both rods, to bring their ground-engaging members into contact with the surface of the ground.

2. A bicycle support, comprising a pair of laterally-projecting, curved brackets disposed in alinement at opposite sides of one wheel of the bicycle in a vertical plane perpendicular to said wheel, and fixed to the adjacent frame member; a vertical rod mounted to slide in the outer end of the lower arm of each bracket and provided at its lower end with a ground-engaging member; a spring associated with each rod to normally hold it in elevated position; a lever fulcrumed intermediate its ends on the outer end of the upper arm of each bracket and having its outer end pivotally connected to the upper end of the adjacent rod; a cable fastened at its lower end to the inner end of each lever; and an operating lever carried by said frame and having the upper ends of both cables fastened thereto, for rocking said levers simultaneously in a direction to forcibly depress both rods, to bring their ground-engaging members into contact with the surface of the ground.

3. A bicycle support, comprising a pair of laterally-projecting, curved brackets disposed in alinement at opposite sides of one wheel of the bicycle in a vertical plane perpendicular to said wheel, and fixed to the adjacent frame member; a hollow, cylindrical casing secured in vertical position to the outer end of the lower arm of each bracket, each casing being closed at opposite ends; a vertical rod mounted to slide through each casing and projecting above and below the same at opposite ends, each rod being provided with a fixed disk arranged within the corresponding casing, and at its lower end with a ground-engaging member; an expansible spring disposed within each casing below the disk therein, so as to normally hold the latter and its rod in elevated position; a lever fulcrumed intermediate its ends on the outer end of the upper arm of each bracket and having its outer end pivotally connected to the upper end of the adjacent rod; a cable fastened at its lower end to the inner end of each lever; and an operating lever carried by said frame and having the upper ends of both cables fastened thereto, for rocking said levers simultaneously in a direction to forcibly depress both rods, to bring their ground-engaging members into contact with the surface of the ground.

In testimony whereof I have affixed my signature.

IGNACIO LÓPEZ BANCALARI.